(12) United States Patent
Maruyama (10) Patent No.: US 8,983,750 B2
(45) Date of Patent: Mar. 17, 2015

(54) DRIVING SUPPORT APPARATUS FOR VEHICLE

(75) Inventor: Tasuku Maruyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 246 days.

(21) Appl. No.: 13/431,875

(22) Filed: Mar. 27, 2012

(65) Prior Publication Data

US 2012/0253628 A1  Oct. 4, 2012

(30) Foreign Application Priority Data

Mar. 29, 2011  (JP) ................................. 2011-073351

(51) Int. Cl.
*B60T 8/32* (2006.01)
*G05D 1/00* (2006.01)
*G06F 7/00* (2006.01)
*G06F 17/00* (2006.01)
*B60K 31/18* (2006.01)
*B60W 50/08* (2012.01)
*B60W 50/14* (2012.01)
*B60W 30/14* (2006.01)
*B60K 31/00* (2006.01)

(52) U.S. Cl.
CPC .............. *B60K 31/18* (2013.01); *B60W 50/085* (2013.01); *B60W 50/14* (2013.01); *B60W 30/143* (2013.01); *B60K 2031/0091* (2013.01); *B60W 2050/146* (2013.01); *B60W 2420/42* (2013.01); *B60W 2520/10* (2013.01); *B60W 2550/22* (2013.01)
USPC .......................................................... 701/93

(58) Field of Classification Search
USPC .......................................................... 701/93
See application file for complete search history.

(56) References Cited

U.S. PATENT DOCUMENTS

| 6,161,072 | A * | 12/2000 | Clapper .......................... 701/93 |
| 6,226,588 | B1 * | 5/2001 | Teramura et al. ............... 701/93 |
| 6,836,719 | B2 * | 12/2004 | Andersson et al. ............. 701/93 |
| 6,963,798 | B2 * | 11/2005 | Heyse .............................. 701/93 |
| 7,440,835 | B2 * | 10/2008 | Shima ............................. 701/93 |
| 7,627,413 | B2 * | 12/2009 | Kawazoe et al. ............... 701/93 |
| 7,911,361 | B2 * | 3/2011 | Kumabe ........................ 340/936 |
| 8,041,493 | B2 * | 10/2011 | Seto et al. ....................... 701/93 |
| 8,085,166 | B2 * | 12/2011 | Tamir et al. ................... 340/901 |
| 8,370,755 | B2 * | 2/2013 | Buecker et al. ................ 715/751 |
| 8,384,532 | B2 * | 2/2013 | Szczerba et al. .............. 340/435 |
| 8,509,971 | B1 * | 8/2013 | Isailovski et al. ............... 701/20 |
| 8,599,005 | B2 * | 12/2013 | Fargas et al. .................. 340/441 |
| 8,630,795 | B2 * | 1/2014 | Breed et al. ................... 701/400 |
| 2005/0131614 | A1 * | 6/2005 | Isogai et al. ..................... 701/93 |
| 2006/0015240 | A1 * | 1/2006 | Shima ............................. 701/93 |
| 2006/0259233 | A1 * | 11/2006 | Chien et al. ................... 701/200 |
| 2010/0141476 | A1 * | 6/2010 | Bauer et al. ................... 340/905 |
| 2010/0207751 | A1 * | 8/2010 | Follmer et al. ................ 340/439 |
| 2012/0162429 | A1 * | 6/2012 | Wuerz-Wessel .............. 348/148 |

FOREIGN PATENT DOCUMENTS

JP  2005-128790 A  5/2005

* cited by examiner

*Primary Examiner* — Nicholas Kiswanto
(74) *Attorney, Agent, or Firm* — McGinn IP Law Group, PLLC (57) ABSTRACT

There is provided a driving support apparatus for a vehicle. When a speed limit that is not equal to a set vehicle speed is detected by a stereo image recognition device, a cruise control unit temporarily performs a standby mode in which a value of the set vehicle speed can be switched to the speed limit, and displays the set vehicle speed and the speed limit so that the speeds can be compared with each other and selectively maintains the set vehicle speed or switches the set vehicle speed to the speed limit based on an operation state by a driver during the standby mode.

8 Claims, 5 Drawing Sheets

DRIVING SUPPORT APPARATUS FOR VEHICLE

CROSS-REFERENCE TO RELATED APPLICATIONS

The present application claims priority from Japanese Patent Application No. 2011-073351 filed on Mar. 29, 2011, the entire contents of which are hereby incorporated by reference.

BACKGROUND OF THE INVENTION

1. Field of the Invention

The present invention relates to a vehicle driving support apparatus for a vehicle having a cruise control function for constant speed cruise at a set vehicle speed set by a driver.

2. Description of Related Art

In recent years, there have been various proposals for driving support apparatuses configured to recognize a vehicle exterior environment in front of a subject vehicle by using a millimeter wave radar, an infrared laser radar, a stereo camera, a monocular camera or the like, and perform cruise control or the like of the subject vehicle based on the recognized vehicle exterior environment. As an example of such cruise control functions, a function of performing a follow-up cruise control to follow a preceding vehicle when such a preceding vehicle detected (captured) in front of a subject vehicle is known widely. Typically, the follow-up cruise control has been widely in practical use as part of an adaptive cruise control (ACC). In the ACC, the follow-up cruise control is performed in a state where a vehicle is detected in front of the subject vehicle, and a constant speed cruise control at a set vehicle speed set by the driver is performed in a state where no preceding vehicle is detected.

When the ACC is performed, speed limits for roads need to be observed. However, the speed limits vary depending on road types such as an expressway and an ordinary road, and may also be changed according to the weather or the like. Accordingly, the driver is always required to pay attention to the speed limit displayed on the road, and perform a troublesome operation to re-enter the set vehicle speed each time the speed limit changes. As a technique for reducing such a workload of the driver, Japanese Patent Application Laid-Open (JP-A) No. 2005-128790, for example, discloses a technique of recognizing a speed limit displayed on a road sign or a road mark based on an image in front of a vehicle captured by a CCD camera, accordingly updating with the obtained speed limit, and outputting an alarm when the vehicle speed exceeds the speed limit.

However, if the technique disclosed in JP-A No. 2005-128790 is applied to the ACC without any modification, the vehicle may be accelerated or decelerated against the intention of the driver when the set vehicle speed deviates largely from the speed limit.

SUMMARY OF THE INVENTION

The present invention has been made in view of the aforementioned circumstances, and aims to provide a vehicle driving support apparatus for a vehicle capable of easily changing a set vehicle speed while respecting the driver's intention when a speed it for a road changes.

A driving support apparatus for a vehicle according to an aspect of the present invention includes: a vehicle speed setting unit for setting a set vehicle speed based on an operation state of an operation input unit by a driver; a constant speed cruise control unit for performing constant cruise control using the set vehicle speed as a target speed; an imaging unit for capturing an image ahead of a subject vehicle; a speed limit recognizing unit for recognizing a speed limit displayed on a sign on a road based on the image captured by the imaging unit; and a vehicle speed switching unit that, when a speed limit different from the set vehicle speed is recognized by the speed limit recognizing unit, temporarily performs a standby mode in which the set vehicle speed can be switched to the speed limit and displays the set vehicle speed and the speed limit so that the speeds can be compared with each other, and selectively maintains the set vehicle speed or switches the set vehicle speed to the speed limit based on an operation state of a selection indicating unit by the driver.

DETAILED DESCRIPTION OF THE PREFERRED EMBODIMENTS

Figure 1:
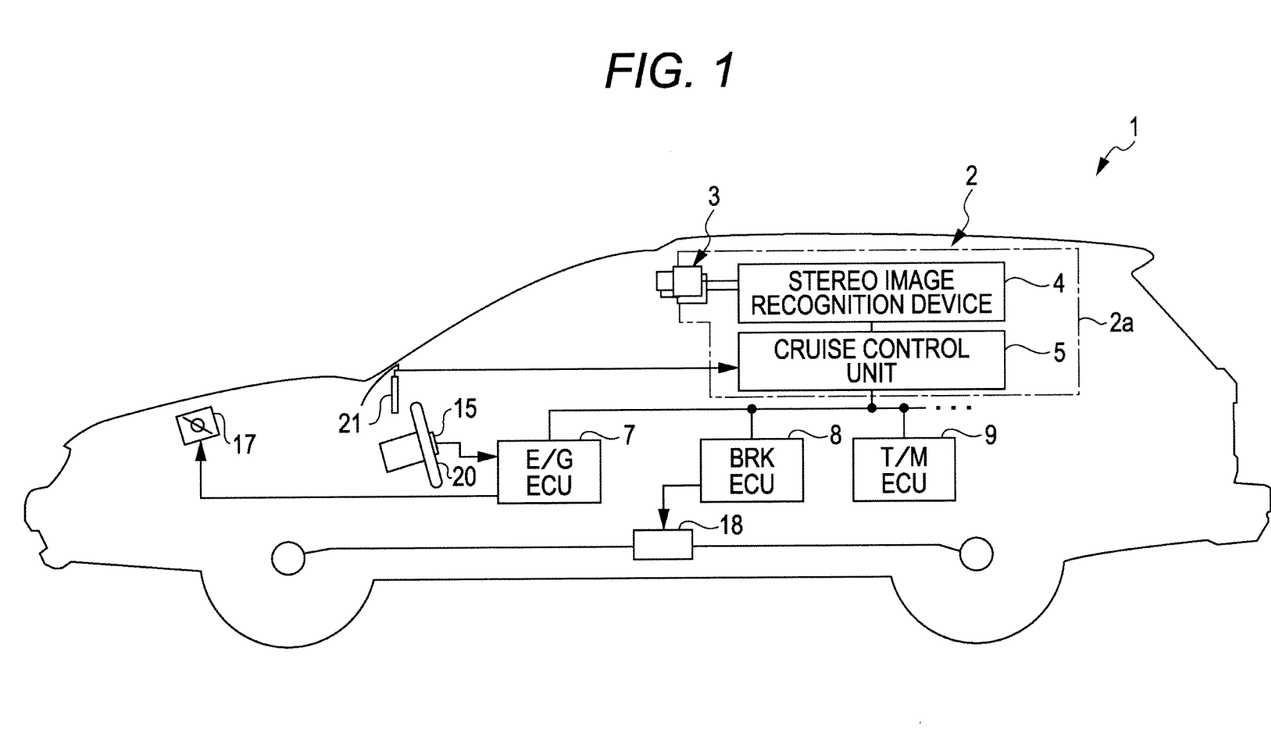
FIG. 1 is a schematic configuration diagram of a driving support apparatus mounted on a vehicle according to a first embodiment of the present invention.
Figure 2:
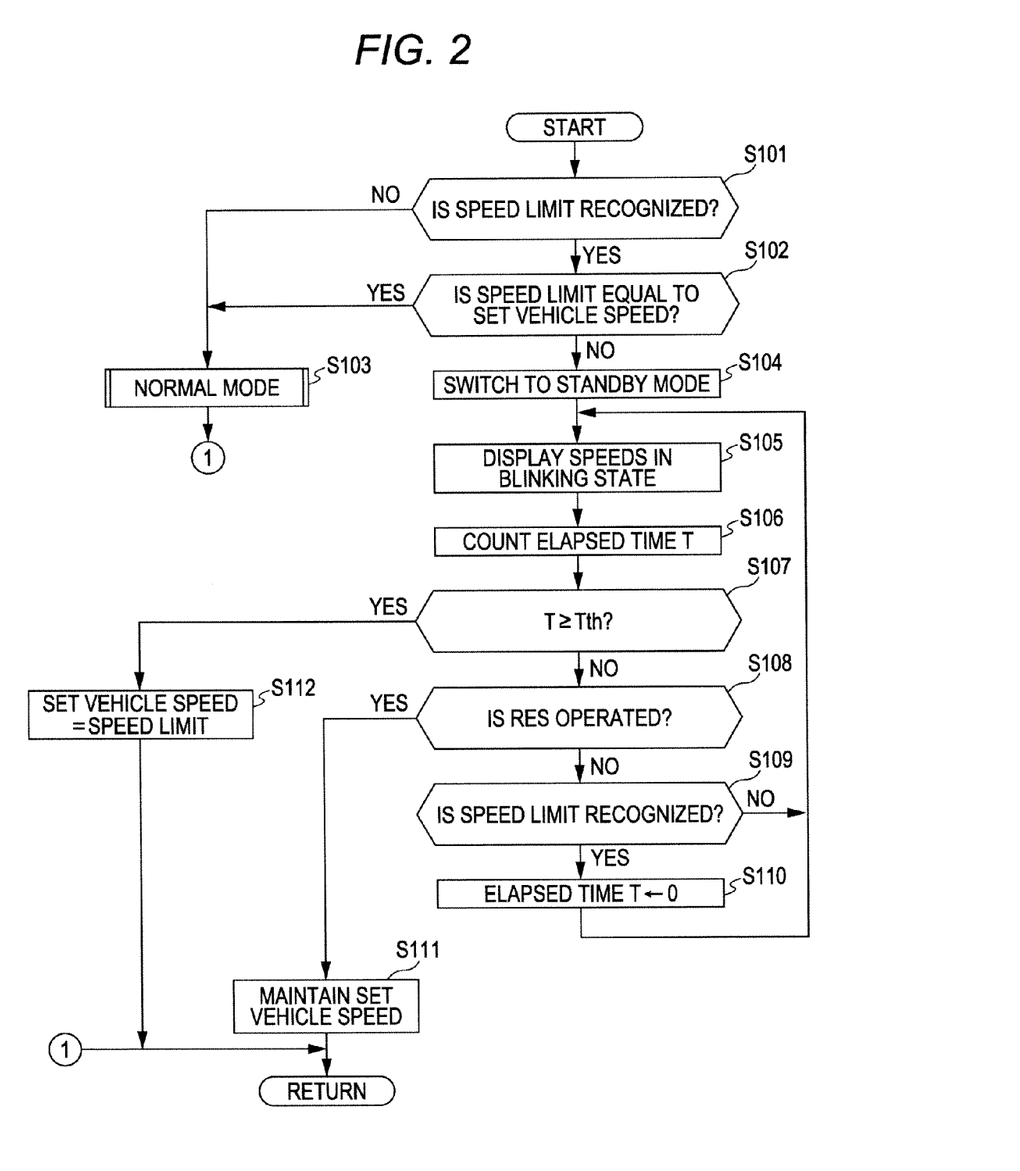
FIG. 2 is a flowchart showing a set vehicle speed setting routine according to the first embodiment.
Figure 3A:
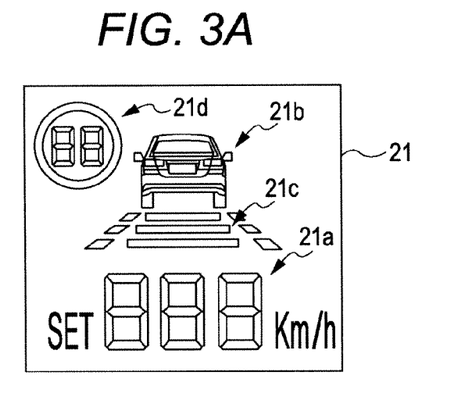
FIG. 3A is an explanatory view showing indicators on a display device for cruise control according to the first embodiment.
Figure 3B:
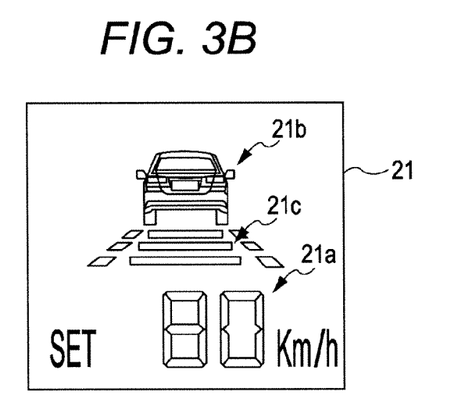
FIG. 3B is an explanatory view showing an example of display on the display device in a normal mode according to the first embodiment.
Figure 3C:
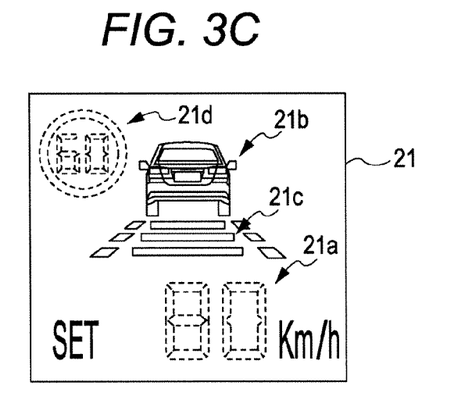
FIG. 3C is an explanatory view showing an example of display on the display device in a standby mode according to the first embodiment.
Figure 4:
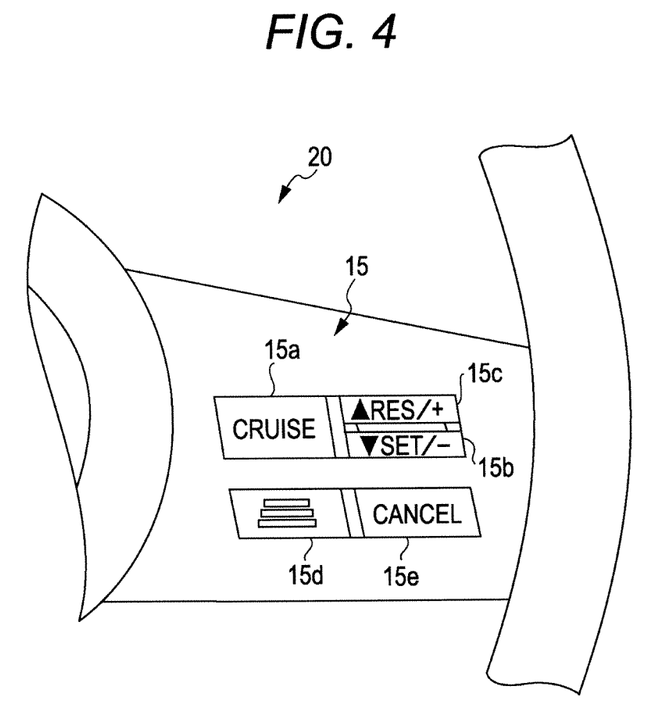
FIG. 4 is a plan view showing an example of a cruise control switch according to the first embodiment.

Embodiments of the present invention will be described below with reference to the drawings. FIGS. 1 to 4 relates to a first embodiment of the present invention, in which FIG. 1 is a schematic configuration diagram of a driving support apparatus mounted on a vehicle; FIG. 2 is a flowchart showing a set vehicle speed setting routine; FIG. 3A is an explanatory view showing indicators on a display device for cruise control; FIG. 3B is an explanatory view showing an example of display on the display device in a normal mode; FIG. 3C is an explanatory view showing an example of display on the display device in a standby mode; and FIG. 4 is a plan view showing an example of a cruise control switch.

In FIG. 1, a vehicle (a subject vehicle) such as an automobile, represented by the reference numeral 1, has a driving support apparatus 2 mounted thereon having an adaptive cruise control (ACC) function.

The driving support apparatus 2 has, for example, a main part mainly constituted by a stereo camera assembly 2a including a stereo camera 3 serving as an imaging unit, a stereo image recognition device 4 and a cruise control unit 5 that are integrated. Various control units such as an engine control unit (E/G_ECU) 7, a brake control unit (BRK_ECU) 8 and a transmission control unit (T/M_ECU) 9 are connected to the cruise control unit 5 of the stereo camera assembly 2a such that the units can communicate with one another.

The stereo camera 3 includes, as a stereo optical system, a pair of left and right CCD cameras having a solid state imaging device such as a charge-coupled device (CCD), for example. The CCD cameras constituting the stereo camera 3 are attached on front portions of a ceiling of a passenger compartment with a predetermined distance therebetween, and capture images of an external subject in stereo from different points of view and output the captured image information to the stereo image recognition device 4.

The stereo image recognition device 4 receives the image information from the stereo camera 3. In addition, for example, the stereo image recognition device 4 receives a speed V of the subject vehicle from the T/M_ECU 9. The stereo image recognition device 4 recognizes forward information such as three-dimensional object data and white line data ahead of the subject vehicle 1 based on the image information from the stereo camera 3, and estimates the road on which the subject vehicle 1 is traveling based on the recognized information. The stereo image recognition device 4 also detects a preceding vehicle on the road on which the subject vehicle 1 is traveling based on the recognized three-dimensional object data or the like.

Specifically, the stereo image recognition device 4 processes the image information from the stereo camera 3 as follows, for example. The stereo image recognition device 4 generates distance information based on a difference between corresponding positions in a pair of left and right images (referred to as a stereo image pair), which are obtained by capturing the environment ahead of the subject vehicle 1 in the traveling direction with the stereo camera 3, by utilizing a principle of triangulation. More specifically, the stereo image recognition device 4 divides a reference image (the right image, for example) into small regions of 4×4 pixels, for example, compares a luminance or color pattern of each small region with that of a comparison image to find a region in the comparison image corresponding thereto and obtain a distance distribution over the entire reference image. The stereo image recognition device 4 further examines a luminance difference from adjacent pixels (adjacent pixels on the right and right below, for example) for each pixel of the reference image, extracts pixels both of which having a luminance difference larger than a threshold as edges, and giving distance information to the extracted pixels (edges) so as to generate a distribution image (distance image) of the edges having the distance information. The stereo image recognition device 4 then performs a known grouping process on the distance image and applies a pattern matching process to the distance image with various preset templates to recognize a white line, a side wall, a three-dimensional object and the like in front of the subject vehicle. The stereo image recognition device 4 then assigns different IDs to the respective recognized data, and monitors the data continuously through frames for each ID. Then, the stereo image recognition device 4 estimates the road on which the subject vehicle 1 is traveling based on the white line data, the side-wall data and the like, and extracts (detects) a three-dimensional object that is present on the road and that moves at a predetermined speed (0 km/h or higher, for example) substantially in the same direction as the subject vehicle 1 as a preceding vehicle. If a preceding vehicle is detected, the stereo image recognition device 4 calculates a preceding vehicle distance D (=inter-vehicle distance), a preceding vehicle speed Vf (=(a rate of change of the inter-vehicle distance D)+(a subject vehicle speed V)), a preceding vehicle acceleration of (=a differential value of the preceding vehicle speed Vf) and the like as information on the preceding vehicle. Among preceding vehicles, a vehicle that travels at a speed Vf of a predetermined value or lower (4 km/h or lower, for example) and that is not accelerated is particularly recognized as a preceding vehicle in a substantially stopped state.

During such processing of image information, the stereo image recognition device 4 also recognizes a speed limit Vlim displayed on a sign of the road. Specifically, the stereo image recognition device 4 has template data for various signs such as road signs and road marks stored therein, and recognizes a sign by a pattern matching process with the templates. When the recognized sign is a speed sign, the stereo image recognition device 4 recognizes a speed limit Vlim displayed on the sign. In this manner, the stereo image recognition device 4 serves as a speed limit recognition unit in the present embodiment.

The cruise control unit 5 receives various recognized information on an environment in front and outside of the subject vehicle 1 from the stereo image recognition device 4 and the subject vehicle speed V from the T/M_ECU 9, for example.

In addition, the cruise control unit 5 receives various input signals operated by the driver through a cruise control switch 15, for example, via the E/G_ECU 7. In the present embodiment, the cruise control switch 15 is an operation switch including push switches, toggle switches and the like disposed on a steering wheel 20, and has a cruise switch (CRUISE) 15a that is a main switch for turning the operation of the ACC on and off, a set switch (SET) 15b for setting a current speed of the subject vehicle 1 as a set vehicle speed Vset, a resume switch (RES) 15c for resetting the set vehicle speed Vset stored previously, an inter-vehicle distance setting switch 15d for setting a mode of the inter-vehicle distance between a preceding vehicle and the subject vehicle, and a cancel switch (CANCEL) 15e for cancelling the ACC. In the present embodiment, the set switch 15b has both of a function as a deceleration switch (∇) of instructing deceleration of the subject vehicle 1 and a function as a down switch (−) of tapping down the set vehicle speed in units of a set value to a lower speed. The resume switch 15c has both of a function as an acceleration switch (Δ) of instructing acceleration of the subject vehicle 1 and a function as an up switch (+) of tapping up the set vehicle in units of a set value to a higher speed.

In addition, a display device 21 for cruise control that is a display device for displaying setting information, control information and the like on the ACC is connected to the cruise control unit 5. In the present embodiment, as shown in FIG. 3A, for example, the display device 21 includes a set vehicle speed display indicator 21a for displaying the set vehicle speed Vset, a preceding vehicle display indicator 21b and an inter-vehicle distance mode display indicator 21c that light up when the stereo image recognition device 4 captures a preceding vehicle, a speed limit display indicator 21d that lights up when the stereo image recognition device 4 recognizes a speed limit Vlim, and the like. The display device 21 is disposed on an instrument cluster, for example.

When the cruise switch 15a is turned on and then the set switch 15b is operated by the driver, for example, the cruise control unit 5 sets the subject vehicle speed V at the time of this operation as the set vehicle speed Vset. Alternatively, for example, when the resume switch 15c is operated by the driver, the cruise control unit 5 sets the set vehicle speed that has been previously set as the current set vehicle speed Vset. In this case, the cruise control unit 5 selectively lights up segments constituting the set vehicle speed display indicator 21a on the display device 21 to display the set vehicle speed Vset, and maintains the display state.

When the inter-vehicle distance setting switch 15d is operated by the driver, the cruise control unit 5 sets an inter-vehicle distance mode (such as any one of "long", "medium" and "short" inter-vehicle distance modes) for setting a follow-up target distance Dtrg, which will be described later. In this case, the cruise control unit 5 displays the current inter-vehicle distance by changing the number of lit segments constituting the inter-vehicle distance mode display indicator 21c on the display device 21.

Then, when the set vehicle speed Vset and the inter-vehicle distance mode are set in this manner, the cruise control unit 5 performs the ACC.

As the ACC, the cruise control unit 5 performs constant speed cruise control that matches the subject vehicle speed V with the set vehicle speed Vset when no preceding vehicle is detected by the stereo image recognition device 4. In addition, the cruise control unit 5 performs follow-up cruise control (including follow-up stopping and follow-up starting) that matches the inter-vehicle distance D between the subject vehicle 1 and a preceding vehicle with the follow-up target distance Dtrg when such a preceding vehicle is recognized by the stereo image recognition device 4 during the constant speed cruise control.

Thus, when the constant speed cruise control is started, the cruise control unit 5 calculates a target acceleration aset for matching the subject vehicle speed V with the set vehicle speed Vset.

Specifically, the cruise control unit 5 calculates a vehicle speed deviation Vsrel (=Vset−V) between the subject vehicle speed V and the set vehicle speed Vset and refers to a map or the like set in advance to calculate the target acceleration aset based on the vehicle speed deviation Vsrel and the subject vehicle speed V. If the vehicle speed deviation Vsrel is a positive value, for example, the target acceleration aset is set to a larger value as the vehicle speed deviation Vsrel is larger within a range up to an upper limit based on the subject vehicle speed V. On the other hand, if the vehicle speed deviation Vsrel is a negative value, the target acceleration aset is set to a smaller value as the vehicle speed deviation Vsrel is smaller within a range up to a lower limit based on the subject vehicle speed V (the target acceleration aset is set to a larger value as a deceleration as the vehicle speed deviation Vsrel is larger on the negative side).

When the control shifts from the constant speed cruise control to the follow-up cruise control, the cruise control unit 5 calculates a target acceleration acar for matching the inter-vehicle distance D with the follow-up target distance Dtrg in addition to the target acceleration aset described above.

Specifically, the cruise control unit 5 has maps set and stored therein in advance for setting a follow-up target distance Dtrg, the maps corresponding to the "short" and "long" inter-vehicle distance modes, for example. In the "short" or "long" mode, the cruise control unit 5 sets the follow-up target distance Dtrg based on the subject vehicle speed V using the corresponding map. In the "medium" mode, the cruise control unit 5 sets an intermediate value between the values calculated in the "short" mode and the "long" mode as the follow-up target distance Dtrg. The cruise control unit 5 also calculates a distance deviation ΔD (=Dtrg−D) between the follow-up target distance Dtrg and the inter-vehicle distance D, calculates a relative distance Vfrel (=Vf−V) between the preceding vehicle speed Vf and the subject vehicle speed V, and refers to a map or the like set in advance using the calculation results as parameters to calculate the target acceleration acar.

Then, the cruise control unit 5 sets the target acceleration aset as a final target acceleration a during the constant speed cruise control, and sets the target acceleration aset or the target acceleration acar, whichever is smaller, as a final target acceleration a during the follow-up cruise control.

After setting the target acceleration a, the cruise control unit 5 produces an acceleration corresponding to the target acceleration a by controlling the opening degree of an electronic control throttle valve 17 (controlling engine output) through the E/G_ECU 7. Furthermore, if it is determined that sufficient acceleration (deceleration) cannot be obtained only by controlling the engine output, the cruise control unit 5 controls a hydraulic pressure output from a brake booster 18 (controls automatic braking application) through the BRK_ECU 8. During the constant cruise control, the cruise control unit 5 displays the set vehicle speed Vset on the set vehicle speed display indicator 21a on the display device 21. During the follow-up cruise control, on the other hand, the cruise control unit 5 displays the preceding vehicle display indicator 21b and the inter-vehicle distance mode display indicator 21c in addition to the display of the set vehicle speed Vset (see FIG. 3B).

The set vehicle speed Vset can be changed as necessary even while the ACC is performed. Specifically, for example, each time the set switch 15b is operated during the ACC, the cruise control unit 5 taps down the set vehicle speed Vset in units of 5 km/h to a lower speed. As another example, when the set switch 15b is continuously operated during the ACC, the cruise control unit 5 performs deceleration control through control of the opening degree of the electronic control throttle valve 17 or the like, and sets the subject vehicle speed V at a timing when the set switch 15b is released as the set vehicle speed Vset. On the other hand, for example, each time the resume switch 15c is operated during the ACC, the cruise control unit 5 taps up the set vehicle speed Vset in units of 5 km/h to a higher speed. As another example, when the resume switch 15c is continuously operated during the ACC, the cruise control unit 5 performs acceleration control through control of the opening degree of the electronic control throttle valve 17 or the like, and sets the subject vehicle speed V at a timing when the resume switch 15c is released as the set vehicle speed Vset.

Furthermore, when a speed limit Vlim is recognized by the stereo image recognition device 4, the cruise control unit 5 temporarily (for 3 minutes, for example) performs a standby mode in which the set vehicle speed Vset can be switched to the speed limit Vlim. Specifically, when the standby mode is entered, the cruise control unit 5 displays the set vehicle speed display indicator 21a and the speed limit display indicator 21d on the display device 21 in blinking states so that the indicators can be compared with each other as shown in FIG. 3C, for example, to prompt the driver to select whether to maintain the set vehicle speed Vset or to change the set vehicle speed Vset to the speed limit Vlim. The cruise control unit 5 then selectively maintains the set vehicle speed Vset or changes the set vehicle speed Vset to the speed limit Vlim according to a given operation state of the driver during the standby mode. In this case, another switch may be provided as a selection instructing unit, but it is preferable that the cruise control switch 15 also serves as a selection instructing unit, for example, so as to simplify the structure. Specifically, in the present embodiment, the resume switch 15c is also used as the selection indicating unit, and the cruise control unit 5 maintains the current set vehicle speed Vset when the resume switch 15c is operated during the standby mode, or changes the set vehicle speed Vset to the speed limit Vlim when the resume switch 15c is not operated during the standby mode, for example.

As described above, the cruise control unit 5 serves as a vehicle speed setting unit, a constant speed cruise control unit and a vehicle speed switching unit in the present embodiment.

Next, control for setting the set vehicle speed performed by the cruise control unit 5 will be described according to the flowchart of a set vehicle speed setting routine in FIG. 2. This routine is repeated at every preset time. When the routine is started, the cruise control unit 5 first examines whether or not a speed limit Vlim for a road on which the subject vehicle is traveling is recognized by the stereo image recognition device 4 in step S101.

Then, the cruise control unit 5 proceeds to step S102 if it is determine in step S101 that a speed limit Vlim is recognized by the stereo image recognition device 4, while it proceeds to step S103 if it is determined that a speed limit Vlim is not recognized.

In step S102 after step S101, the cruise control unit 5 examines whether or not the recognized speed limit Vlim is equal to the current set vehicle speed Vset.

Then, the cruise control unit 5 proceeds to step S103 if it is determined in step S102 that the speed limit Vlim is equal to the set vehicle speed Vset, or proceeds to step S104 if it is determined that the speed limit Vlim is not equal to the set vehicle speed Vset.

In step S103 after step S101 or step S102, the cruise control unit 5 performs a normal mode as a mode for setting the set vehicle speed and sets or changes the set vehicle speed Vset according to an operational input to the cruise control switch 15 by the driver. Specifically, immediately after the cruise switch 15*a* is turned on by the driver and before performing the ACC, for example, if the set switch 15*b* is operated, the cruise control unit 5 sets the subject vehicle speed V at the time of this operation as the set vehicle speed Vset, or if the resume switch 15*c* is operated, the cruise control unit 5 sets the set vehicle speed previously set as the current set vehicle speed Vset. While the ACC is performed, for example, the cruise control unit 5 taps down or up the set vehicle speed Vset each time the set switch 15*b* or the resume switch 15*c* is operated, and if the set switch 15*b* or the resume switch 15*c* is continuously operated, the cruise control unit 5 performs deceleration control or acceleration control of the subject vehicle 1 and sets the subject vehicle speed V at a timing when the switch operation is released as the set vehicle speed Vset.

On the other hand, in step S104 after step S102, the cruise control unit 5 switches the mode for setting the set vehicle speed from the normal mode to the standby mode. In the subsequent step S105, the cruise control unit 5 displays the set vehicle speed Vset and the speed limit Vlim in blinking states through the set vehicle speed display indicator 21*a* and the limited speed display indicator 21*b* so that the speeds can be compared with each other (see FIG. 3C).

In step S106 after step S105, the cruise control unit 5 counts an elapsed time T that has passed after entering the standby mode. In the subsequent step S107, the cruise control unit 5 examines whether or not the elapsed time T is equal to or longer than a preset amount of time Tth (Tth=3 s, for example).

If it is determined in step S107 that the elapsed time T is equal to or longer than the preset amount of time Tth, the cruise control unit 5 proceeds to step S112 where it switches the value of the set vehicle speed Vset to the speed limit Vlim, and then exits the routine.

On the other hand, if it is determined in step S107 that the elapsed time T is shorter than the preset amount of time Tth, the cruise control unit 5 proceeds to step S108 where it examines whether or not the resume switch 15*c* is operated by the driver.

If it is determined in step S108 that the resume switch 15*c* is operated, the cruise control unit 5 proceeds to step S111 where it exits the routine with the current set vehicle speed Vset being maintained.

On the other hand, if it is determined in step S108 that the resume switch 15*c* is not operated by the driver, the cruise control unit 5 proceeds to step S109 where it examines whether or not a new speed limit Vlim is recognized by the stereo image recognition device 4.

If it is determined in step S109 that a new speed limit Vlim is not recognized, the cruise control unit 5 returns to step S105. If it is determined that a new speed limit Vlim is recognized, the cruise control unit 5 proceeds to step S110 where it resets the elapsed time T to "0" so that the time during which the standby mode is performed is newly counted (so that the time during which the standby mode is performed is extended), and returns to step S105.

According to such an embodiment, when a speed limit Vlim that is not equal to the set vehicle speed Vset is detected by the stereo image recognition device 4, the standby mode in which the set vehicle speed Vset can be switched to the speed limit Vlim is temporarily performed, the set vehicle speed Vset and the speed limit Vlim are displayed so that the speeds can be compared with each other during the standby mode, and the set vehicle speed Vset is selectively maintained or switched to the speed limit Vlim based on the operation state of the driver. Consequently, when the speed limit for a road is changed, the set vehicle speed Vset can be easily changed, while respecting the driver's intension.

Thus, it is possible to reduce the monitoring workload or the like of the driver by recognizing the speed limit Vlim with the stereo image recognition device 4. Then, if a speed limit Vlim that is not equal to the set vehicle speed Vset is detected, the set vehicle speed Vset and the speed limit Vlim are displayed so that the speeds can be compared with each other, and the set vehicle speed Vset is selectively maintained or switched to the speed limit Vlim based on the operation state of the driver set in advance. Consequently, it is possible to leave whether to switch the set vehicle speed Vset to the speed limit Vlim to the intention of the driver. Moreover, the driver need not perform the operation to input the value of the speed limit Vlim for switching the set vehicle speed Vset to the speed limit Vlim, and can thus easily change the set vehicle speed Vset.

More specifically, during the standby mode, if the driver operates the resume switch 15*c*, the set vehicle speed Vset is maintained, or if the driver does not operate the resume switch 15*c*, the value of the set vehicle speed Vset is switched to the speed limit Vlim. Consequently, even when the speed limit Vlim for a road is changed, the driver can reflect his/her intention in the set vehicle speed Vset only by a simple operation matching his/her feeling.

Figure 5:
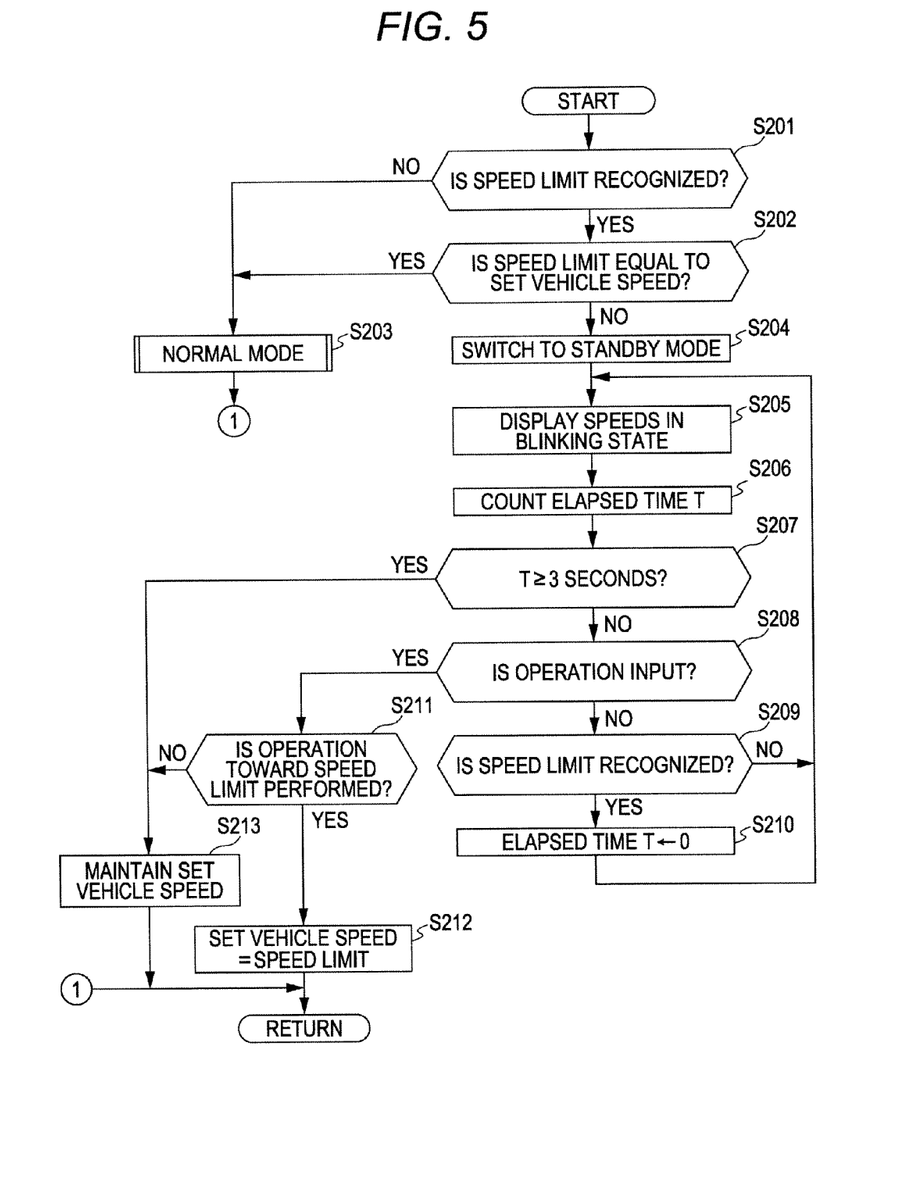
FIG. 5 is a flowchart showing a vehicle speed setting routine according to a second embodiment of the present invention.

Next, a second embodiment of the present invention will be described with reference to FIG. 5. FIG. 5 is a flowchart showing a vehicle speed setting routine. Note that, the present embodiment is different from the first embodiment described above mainly in the operation performed by the driver for selectively maintaining the set vehicle speed Vset or switching to the speed limit Vlim. Any redundant description will be omitted.

In the present embodiment, the set switch (down switch) 15*b* and the resume switch (up switch) 15*c* of the cruise control switch 15 also serve as selection instructing units.

When the standby mode is entered as a result of recognition of the speed limit Vlim by the stereo image recognition device 4, the cruise control unit 5 displays the set vehicle speed display indicator 21*a* and the speed limit display indicator 21*d* on the display device 21 in blinking states so that the indicators can be compared with each other to prompt the driver to select whether to maintain the set vehicle speed Vset or to change the set vehicle speed Vset to the speed limit Vlim. Then, during the standby mode entered as a result of recognizing a speed limit Vlim higher than the set vehicle speed Vset, if the resume switch (up switch) 15*c* is operated by the driver, the cruise control unit 5 switches the set vehicle Vset to the value of the speed limit Vlim and then enters the normal mode, or if the set switch (down switch) 15b is operated by the driver, the cruise control unit 5 maintains the set vehicle speed Vset and enters the normal mode. On the other hand, during the standby mode entered as a result of recognizing a speed limit Vlim lower than the set vehicle speed Vset, if the resume switch (up switch) 15c is operated by the driver, the cruise control unit 5 maintains the set vehicle speed Vset and enters the normal mode, or if the set switch (down switch) 15b is operated by the driver, the cruise control unit 5 switches the set vehicle Vset to the value of the speed limit Vlim and then enters the normal mode. If a preset amount of time (3 seconds, for example) has passed without the resume switch (up switch) 15c and the set switch (down switch) 15b being operated after the standby mode is entered, the cruise control unit 5 maintains the set vehicle speed Vset and enters the normal mode.

Next, control for setting the set vehicle speed performed by the cruise control unit 5 will be described according to the flowchart of a set vehicle speed setting routine in FIG. 5. This routine is repeated at every preset time. When the routine is started, the cruise control unit 5 performs in steps S201 to S206 the same processes as in steps S101 to S106 described in the first embodiment described above.

In step S207 after step S206, the cruise control unit 5 examines whether or not the elapsed time T is equal to or longer than a preset amount of time Tth (Tth=3 s, for example).

If it is determined in step S207 that the elapsed time T is equal to or longer than the preset amount of the Tth, the cruise control unit 5 proceeds to step S213 where it exits the routine with the current set vehicle speed Vset being maintained.

On the other hand, if it is determined in step S207 that the elapsed time T is shorter than the preset amount of time Tth, the cruise control unit 5 proceeds to step S208 where it examines whether or not the resume switch (up switch) 15c or the set switch (down switch) 15b is operated by the driver.

If it is determined in step S208 that the resume switch 15c or the set switch 15b is operated, the cruise control unit 5 proceeds to step S211 where it examines whether or not the operation is made toward the speed limit Vlim.

In other words, in step S211, the cruise control unit 5 examines whether or not the resume switch (up switch) 15c is operated when a speed limit Vlim higher than the set vehicle speed Vset is recognized, or examines whether or not the set switch (down switch) 15 b is operated when a speed limit (Vlim) lower than the set vehicle speed Vset is recognized.

If it is determined in step S211 that the operation toward the speed limit Vlim is performed, the cruise control unit 5 proceeds to step S212 where it changes the value of the set vehicle speed Vset to the speed limit Vlim and then exits the routine.

On the other hand, if it is determined in step S211 that the operation toward the speed limit Vlim is not performed, the cruise control unit 5 proceeds to step S213 where it exits the routine with the current set vehicle speed Vset being maintained. In step S213 after step S211, the set vehicle speed Vset may be tapped up or tapped down based on whether the operated switch is the resume switch (up switch) 15c or the set switch (down switch) 15b.

If it is determined in step S208 that neither of the resume switch 15c and the set switch 15b is operated, the cruise control unit 5 proceeds to step S209 where it examines whether or not a new speed limit Vlim is recognized by the stereo image recognition device 4.

If it is determined in step S209 that a new speed limit Vlim is not recognized, the cruise control unit 5 returns to step S205. If it is determined that a new speed limit Vlim is recognized, the cruise control unit 5 proceeds to step S210 where it resets the elapsed time T to "0" so that the time during which the standby mode is performed is newly counted (so that the time during which the standby mode is performed is extended), and returns to step S205.

According to such an embodiment, while the effects substantially the same as those of the first embodiment described above are achieved, the intention of the driver of whether to switch the set vehicle speed Vset can be reflected more explicitly by requiring the operation of the driver for both of maintaining the set vehicle speed Vset and switching to the speed limit Vlim. Since the instruction of whether or not to switch the set vehicle speed Vset is made through the up switch and the down switch in this case, the driver can indicate his/her intention by an intuitive operation.

Note that the present invention is not limited to the embodiments described above, and various variations and modifications are possible, and that such variations and modifications are within the technical scope of the present invention.

What is claimed is:

1. A driving support apparatus for a vehicle, comprising:
   a vehicle speed setting unit for setting a set vehicle speed based on an operation state to an operation input unit by a driver;
   a constant speed cruise control unit for performing constant cruise control using the set vehicle speed as a target speed;
   an imaging unit for capturing an image ahead of a subject vehicle;
   a speed limit recognizing unit for recognizing a speed limit displayed on a sign on a road based on the image captured by the imaging unit; and
   a vehicle speed switching unit that, when a speed limit different from the set vehicle speed is recognized by the speed limit recognizing unit, temporarily performs a standby mode in which the set vehicle speed can be switched to the recognized speed limit and displays the set vehicle speed and the recognized speed limit so that the speeds can be compared with each other, wherein
   the operation input unit includes an up switch for changing a current set vehicle speed to be higher and a down switch for changing a current set vehicle speed to be lower,
   during the standby mode entered as a result of recognizing the speed limit higher than the set vehicle speed, the vehicle speed switching unit switches the set vehicle speed to the speed limit when the up switch is operated by the driver and maintains the set vehicle speed when the down switch is operated by the driver, and
   during the standby mode entered as a result of recognizing the speed limit lower than the set vehicle speed, the vehicle speed switching unit maintains the set vehicle speed when the up switch is operated by the driver, and switches the set vehicle speed to the speed limit when the down switch is operated by the driver.

2. The driving support apparatus for a vehicle according to claim 1, wherein
   the operation input unit includes a resume switch for returning a current set vehicle speed to a previous set vehicle speed; and
   the vehicle speed switching unit maintains the set vehicle speed when the resume switch is operated by the driver during the standby mode, or switches the set vehicle speed to the speed limit when the resume switch is not operated by the driver during the standby mode.

3. The driving support apparatus for a vehicle according to claim 2, wherein
when a new speed limit is recognized by the speed limit recognizing unit during the standby mode, the vehicle speed switching unit extends a time during which the standby mode is performed.

4. The driving support apparatus for vehicle according to claim 1, wherein
when neither the up switch nor the down switch is operated by the driver during the standby mode, the vehicle speed switching unit maintains the set vehicle speed.

5. The driving support apparatus for a vehicle according to claim 4, wherein
when a new speed limit is recognized by the speed limit recognizing unit during the standby mode, the vehicle speed switching unit extends a time during which the standby mode is performed.

6. The driving support apparatus for a vehicle according to claim 1, wherein
when a new speed limit is recognized by the speed limit recognizing unit during the standby mode, the vehicle speed switching unit extends a time during which the standby mode is performed.

7. The driving support apparatus for a vehicle according to claim 1, further comprising:
a display device,
wherein during performing the standby mode, the constant speed cruise control unit displays the set vehicle speed and the recognized speed limit on the display device simultaneously.

8. The driving support apparatus for a vehicle according to claim 7, wherein after the set vehicle speed and the recognized speed limit are displayed, the vehicle speed switching unit prompts the driver to select whether to maintain the set vehicle speed or to change the set vehicle speed to the recognized speed limit.

* * * * *